Figure 1:
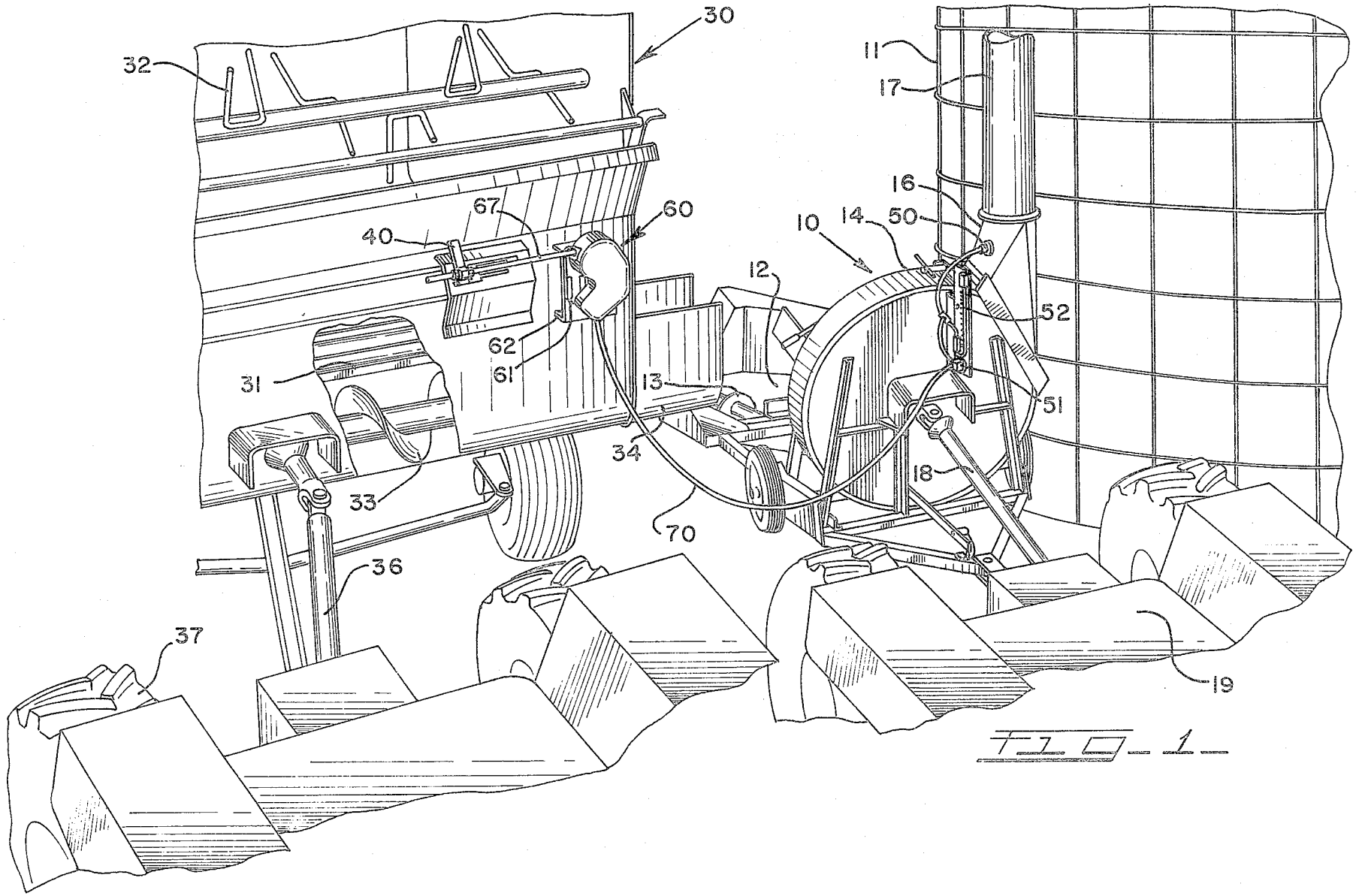
Figure 2:
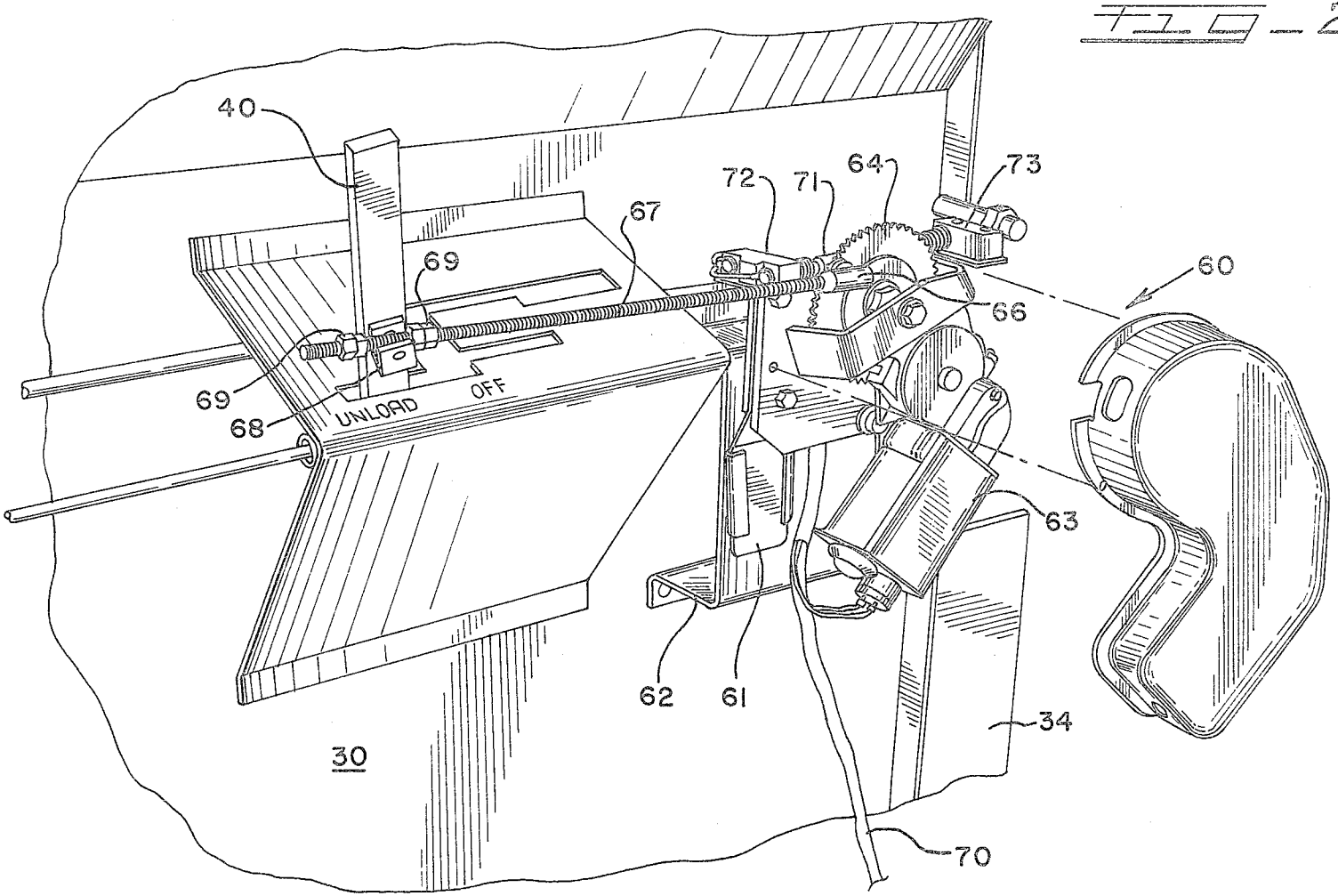
Figure 4:
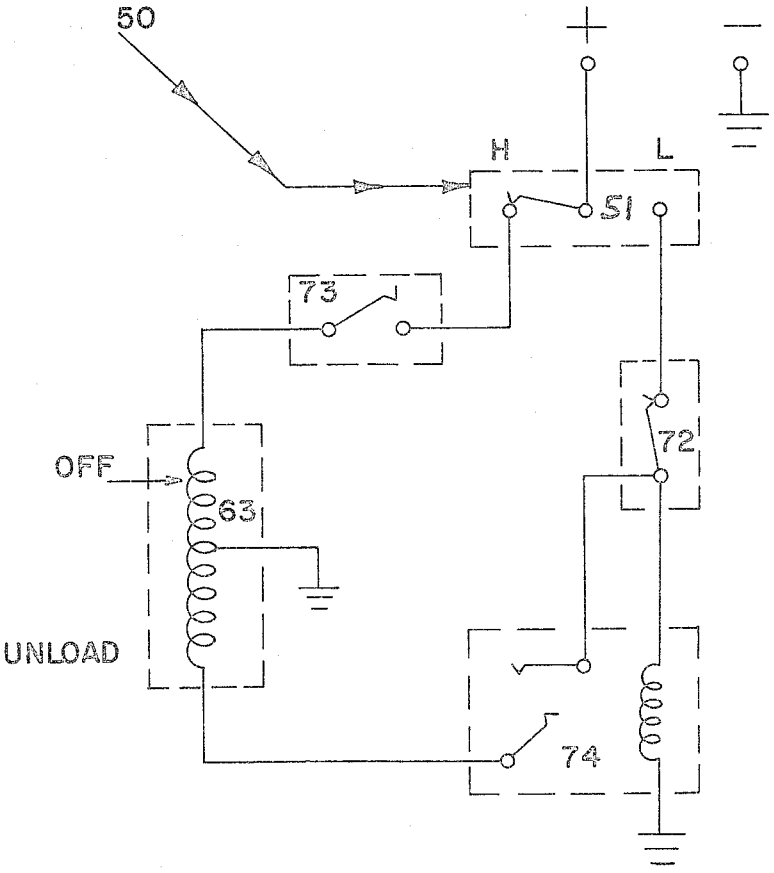
Figure 3:
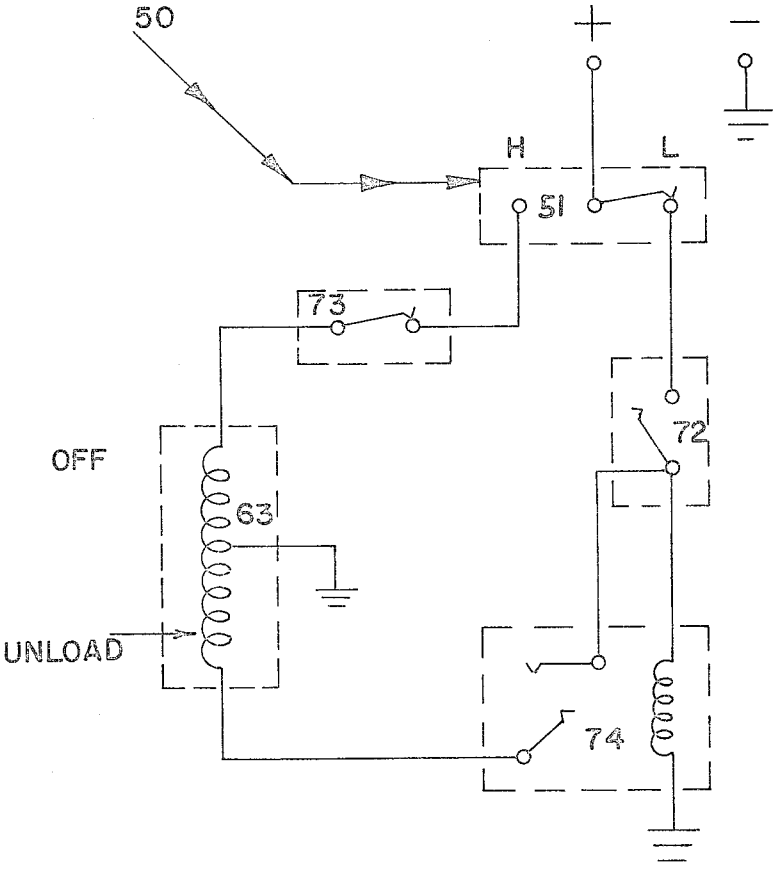

United States Defensive Publication [19] (H) [11] T988,005

Patterson et al. [43] Nov. 6, 1979

[54] AUTOMATIC FEED CONTROL SYSTEM

[75] Inventors: N. Donald Patterson, Woodford, Va.; Anthony J. Falanga, Lemont; Edward J. Johnston, La Grange Park; Thomas J. Scarnato, Barrington, all of Ill.

[73] Assignee: International Harvester Company, Chicago, Ill.

[21] Appl. No.: 948,716

[22] Filed: Oct. 5, 1978

Related U.S. Application Data

[63] Continuation of Ser. No. 666,729, Mar. 15, 1976, abandoned.

[51] Int. Cl.[2] ..... B65G 53/66

[52] U.S. Cl. ..... 406/30

[57] ABSTRACT

An automatic feed control system for a forage blower of the type adapted to be fed by a forage unloading wagon including a pressure switch connected to the blower discharge pipe, a device for controlling the discharge rate of the wagon to the blower, and electrical circuitry connecting the switch and control device so that when pressure in the discharge pipe exceeds a given level, the pressure switch actuates the control device to reduce the feed rate of the crops to the blower from the wagon.

3 Claims, 3 Sheets Drawing,

16 Pages Specification

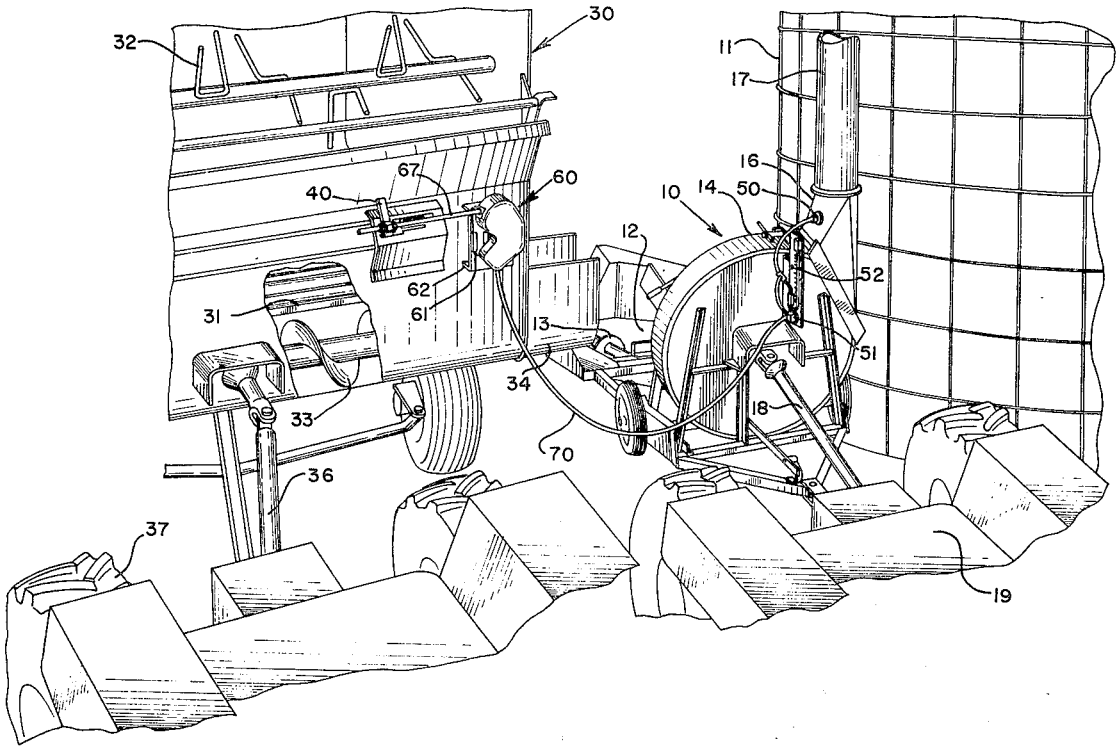

The file of this unexamined application may be inspected and copies thereof may be purchased (849 O.G. 1221, Apr. 9, 1968).